(No Model.)
D. & W. RUNCK.
GARDEN IMPLEMENT.
No. 517,888. Patented Apr. 10, 1894.
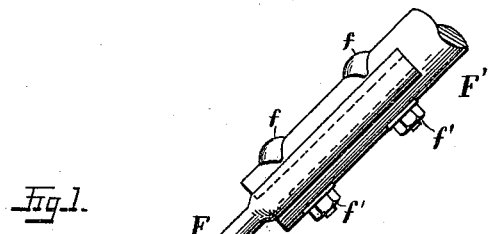
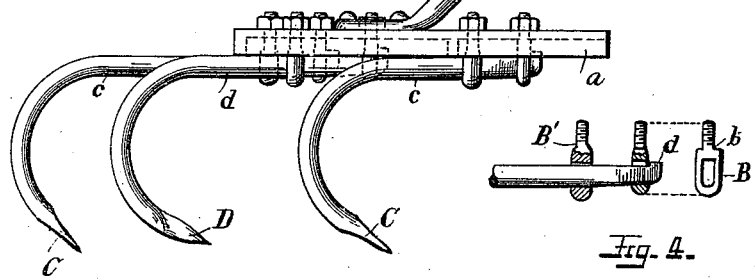
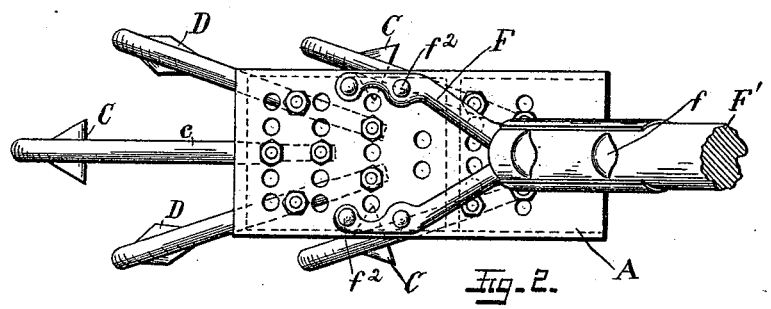
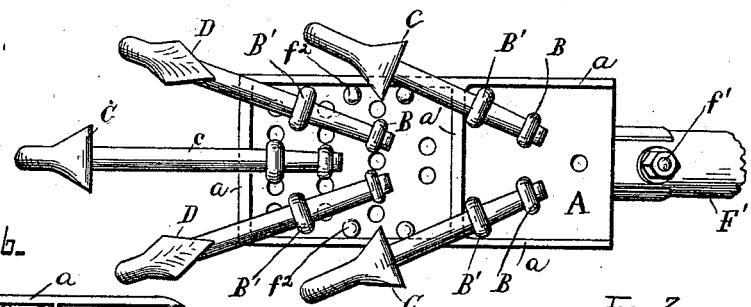
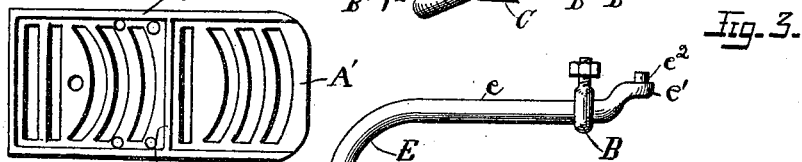
Witnesses: Inventors:
Ralph C. Enyart Daniel Runck
A. E. Grand Pierce William Runck
By Geo. J. Murray
Atty.
THE NATIONAL LITHOGRAPHING COMPANY,
WASHINGTON, D. C.

UNITED STATES PATENT OFFICE.

DANIEL RUNCK AND WILLIAM RUNCK, OF DELHI, OHIO.

GARDEN IMPLEMENT.

SPECIFICATION forming part of Letters Patent No. 517,888, dated April 10, 1894.

Application filed June 19, 1893. Serial No. 478,131. (No model.)

*To all whom it may concern:*

Be it known that we, DANIEL RUNCK and WILLIAM RUNCK, citizens of the United States, and residents of Delhi, in the county of Hamilton and State of Ohio, have invented certain new and useful Improvements in Garden Implements, of which the following is a specification.

The object of our invention is to provide a garden implement combining in its structure a hoe, and weed cutter, cultivator and rake, the different parts being removable, so that the implement may be changed for the various uses required in gardening.

The invention will be first fully described in connection with the accompanying drawings, and then particularly referred to and pointed out in the claims.

Referring to the drawings, in which like parts are represented by similar reference letters wherever they occur throughout the various views: Figure 1 is a side elevation of an implement embodying our improvement. Fig. 2 is a top or plan view of the same; Fig. 3 an inverted plan view; Fig. 4 a detailed view of the attaching end of the teeth and means for attaching it to the plate, the view to the left being partly in side elevation and partly in vertical section, and the view to the right showing one of the eye bolts in front elevation. Fig. 5 is a side elevation of a modified form of a rake tooth. Fig. 6 is a plan view on a diminished scale of a modified form of the plate or holder.

The body of the implement consists of the plate A, which is preferably made of cast, malleable metal, and has a downwardly projecting ledge or rib $a$ extending around each side and front, and a transverse rib $a'$ uniting the side ribs $a$. The plate is perforated to receive the screw threaded shanks of the eye bolts B and B', which hold the arms of the hoe or cutting blades C, the cultivator teeth D, and the rake teeth E, to the under side of the plate A. The arms of the teeth are rounded, except at the rear ends, which are flattened, and have upturned hooks $d$.

As seen in Fig. 4, at the rear end the eye bolt B' snugly fits the arms $c$ and $d$, and the eye of the bolt B, which is rectangular except at the bottom, is deep enough to pass the hooked end $d$ through it, and the sides of the loop or eye snugly fit against the flattened sides of the end of the arms. The eye bolt B has also a shank $b$, which rests against the under side of the plate, while the eye bolt B' is tapered off so that it may draw up tightly into the perforations of the plate A.

To secure the arms of the implement to the plate A, the eye bolts B are first tightened securely in the plate, the bolts B' passed over the arms and the screw threaded shanks passed through the desired perforations in the plate A. The nuts are then tightened up on the top of the screw threaded shanks of eye-bolts B' to draw the arms firmly against the ribs $a$ and $a'$, and force the ends of the arms up against the top of the eye-bolts B. The hooked end of the arm passing back of the shoulder of the eye bolt prevents it from being drawn outwardly, the flattened sides of the arm ends fitting snugly into the eye of the bolts B to prevent any wabbling or side movement.

In the forms shown in Figs. 1 to 3 inclusive, I have shown the implement fitted only with the cutter or hoe blades C, and the cultivator points D. When so fitted, the implement is used as a hoe, weed cutter, and for coarsely breaking up the soil. But when the ground has been freed of weeds, the hoe or cutter teeth C are removed and replaced by round hooked rake teeth E, and we find, in practice, that the cultivator teeth D need not be removed, as the implement with the combined rake and cultivator teeth loosens the ground better than if only rake teeth were employed, but for raking weeds or cleaning up the surface of the ground, the implement may be fitted with rake teeth only, the different teeth being interchangeable; one set being readily removed and replaced by others, it is only necessary to supply the different kinds of teeth, the same body and handle being used for all. The handle, socket or shank F may be of any approved construction, in the form shown. It consists of a flattened plate adapted to fit a slot in the handle F', and having flanges upon each side to embrace the sides of the handle opposite the slot, the parts being secured together by "T" bolts $f$, the shanks of which pass through the handle and flattened portion of the shank, and have tightening nuts $f'$ to hold them firmly together. The shank is bifurcated and its ends perforated to receive the rivets $f^2$, by which it is firmly secured to the plates A. The shank may be made of wrought or cast malleable metal.

In the modification shown in Fig. 5, the arm $e$ has its inner end bent upwardly, terminating in the boss $e'$, from which projects a pin $e^2$. The pin $e^2$ is to pass through one of the perforations in the plate, and the flattened upper portion of the boss rests against the under side of the plate. The eye bolt B', in this case, as in the other, draws the arm $e$ firmly against the ledges $a$ and $a'$ and the pin $e^2$ prevents the teeth from being drawn forward or wabbling to either side. This construction may be used to as good advantage as the preferred form upon the rounded rake teeth E, as the eye bolt B' may be slipped on after the teeth are finished, but the preferred form of arm shown in Fig. 4 is preferable for the cutter or cultivator teeth, as the eye bolts can be passed over these after they are finished, and hence should any of the eye bolts break, or the screws strip off, it would be difficult to apply a new eye bolt, whereas in the preferred form the teeth and eye bolts may be furnished separately, the reduced inner end of the arm being small enough to pass through the eye bolt B'.

It is obvious that a greater number of teeth may be used than we show, and that they may be adjusted so as to give a wider spread to the teeth, if desired. It is believed that the perforated form of plate shown in Figs. 1 to 3 inclusive, would make a stronger implement than the slotted form of plate shown in Fig. 6, but for a light implement, the form shown in Fig. 6 is preferable, as it admits of a more ready adjustment of the teeth to the duties required of the instrument.

What we claim as new, and desire to secure by Letters Patent, is—

1. The combination, in a garden implement, of the plate perforated and having ledges to furnish bearings for the arms of the hooked teeth, the handle and shank secured to the top of said plate, the hooked teeth removably and adjustably secured to the under side of said plate, and fastenings to hold the said fingers to the plate, substantially as shown and described.

2. In a garden implement, the combination of the perforated plate having downwardly projecting ledges, the handle socket secured to the plate, the hooked arms carrying cutter teeth at their ends, said cutter teeth and cultivator teeth being alternately secured to the bottom of said plate, and eye bolts for removably and adjustably securing the arms of the teeth to the plate, substantially as shown and described.

3. The combination, substantially as hereinbefore set forth, of the plate A having downwardly projecting ledges $a$ and $a'$, the arms having their forward ends curved downwardly toward the ground, their opposite ends flattened and hooked, the eye bolt B to receive the flattened end of said arms and the eye bolt B' to pass over the arms, said eye bolts having screw threaded shanks to pass through the perforated plate and tightening nuts on the top for drawing the arms against the ledges and holding the arms rigidly in place.

DANIEL RUNCK.
WILLIAM RUNCK.

Witnesses:
GEO. J. MURRAY,
LOUIS MURRAY.